US009515732B2

(12) United States Patent
Hill et al.

(10) Patent No.: US 9,515,732 B2
(45) Date of Patent: Dec. 6, 2016

(54) OPTICAL TRANSMISSION

(71) Applicant: Fibercore Limited, Chilworth, Southampton (GB)

(72) Inventors: Mark David Hill, Southampton (GB); Judith Hankey, Southampton (GB)

(73) Assignee: Fibercore Limited, Chilworth (GB)

( * ) Notice: Subject to any disclaimer, the term of this patent is extended or adjusted under 35 U.S.C. 154(b) by 64 days.

(21) Appl. No.: 14/564,619

(22) Filed: Dec. 9, 2014

(65) Prior Publication Data

US 2016/0164609 A1    Jun. 9, 2016

(30) Foreign Application Priority Data

Dec. 10, 2013    (GB) .................................. 1321845.8

(51) Int. Cl.
| | |
|---|---|
| H01S 3/00 | (2006.01) |
| H04B 10/118 | (2013.01) |
| H01S 3/067 | (2006.01) |
| H01S 3/094 | (2006.01) |
| H01S 3/16 | (2006.01) |
| H01S 3/17 | (2006.01) |

(52) U.S. Cl.
CPC ......... *H04B 10/118* (2013.01); *H01S 3/06716* (2013.01); *H01S 3/06766* (2013.01); *H01S 3/0014* (2013.01); *H01S 3/094003* (2013.01); *H01S 3/1608* (2013.01); *H01S 3/1693* (2013.01); *H01S 3/1695* (2013.01); *H01S 3/1696* (2013.01); *H01S 3/176* (2013.01)

(58) Field of Classification Search
CPC . H01S 3/06741; H01S 3/067; H01S 3/06754
USPC .......................................... 372/6; 359/341.3
See application file for complete search history.

(56) References Cited

U.S. PATENT DOCUMENTS

| | | | |
|---|---|---|---|
| 5,858,891 A | 1/1999 | Auzel et al. | |
| 6,226,308 B1 | 5/2001 | Samson et al. | |
| 7,724,423 B2 * | 5/2010 | Bollond ............. | H01S 3/06754 359/341.3 |
| 7,725,028 B1 * | 5/2010 | Birk ................... | H04J 14/0226 398/66 |
| 8,259,389 B2 | 9/2012 | Pastouret et al. | |

(Continued)

FOREIGN PATENT DOCUMENTS

| | | |
|---|---|---|
| EP | 0426222 | 5/1991 |
| EP | 2187486 | 5/2010 |

(Continued)

OTHER PUBLICATIONS

Extended European Search Report dated Jul. 30, 2015 for European Patent Application No. 14197127.5.
Zotov K. V. et al.; "Radiation Resistant ER-Doped Fibers: Optimization of Pump Wavelength:" Phot. Tech. Let.; Sep. 1, 2008; pp. 1476-1478; vol. 20; No. 17.
Sheng Hsiung Chang et al.; "Photo Annealing Effect of Gamma-Irradiated Erbium-Doped Fibre by Femtosecond Pulsed Laser;" Journal of Physics D: Applied Physics; pp. 1-6; 2013; vol. 46.

(Continued)

*Primary Examiner* — Mark Hellner
(74) *Attorney, Agent, or Firm* — Fleit Gibbons Gutman Bongini & Bianco PL; Paul D. Bianco; Gary S. Winer

(57) ABSTRACT

A spacecraft or satellite optical transmission apparatus (10) including an optical fiber (11) and at least one optical pump source (14) operatively coupled to provide pump energy to the optical fiber (11), the optical fiber (11) comprising an active trivalent dopant such as erbium and at least one passive trivalent dopant such as lanthanum. A method for transmitting electromagnetic radiation in a high radiation environment is also disclosed.

24 Claims, 5 Drawing Sheets

(56) References Cited

U.S. PATENT DOCUMENTS

| | | | |
|---|---|---|---|
| 8,467,123 | B2 | 6/2013 | Regnier et al. |
| 8,958,674 | B2 | 2/2015 | Pastouret et al. |
| 9,306,363 | B1* | 4/2016 | Braga .................... G01B 7/003 |
| 2003/0156318 | A1 | 8/2003 | Anderson et al. |
| 2004/0174917 | A1 | 9/2004 | Riman et al. |
| 2010/0118388 | A1 | 5/2010 | Pastouret et al. |
| 2010/0135627 | A1 | 6/2010 | Pastouret et al. |
| 2010/0142033 | A1 | 6/2010 | Regnier et al. |
| 2012/0134376 | A1 | 5/2012 | Burov et al. |
| 2012/0148206 | A1 | 6/2012 | Boivin et al. |

FOREIGN PATENT DOCUMENTS

| | | |
|---|---|---|
| EP | 2194408 | 6/2010 |
| EP | 2194620 | 6/2010 |
| EP | 2463970 | 6/2012 |
| WO | 9708790 | 3/1997 |
| WO | 03057640 | 7/2003 |

OTHER PUBLICATIONS

Mikhail E. Likhachev et al.; "Radiation Resistance of ER-Doped Silica Fibers: Effects of Host Glass Composition;" Journal of Lightwave Technology; pp. 749-755; Mar. 1, 2013; vol. 31.

Todd S. Rose et al.; "Gamma and Proton Radiation Effects in Erbium-Doped Fiber Amplifiers: Active and Passive Measurements;" Journal of Lightwave Technology; Dec. 2001; pp. 1918-1923; vol. 19; No. 12.

British Search Report dated Apr. 29, 2014 for GB Application No. 1321845.8.

D. L. Griscom, M. E. Gingerich and E. J. Friebele; "Model for the Dose, Dose-Rate and Temperature Dependence of Radiation-Induced Loss in Optical Fibers;" Transactions on Nuclear Science; Jun. 1994; pp. 523-527; vol. 41; No. 3.

G. M. Williams and E. J. Friebele; "Space Radiation Effects on Erbium-Doped Fiber Devices: Sources, Amplifiers, and Passive Measurements;" Transactions on Nuclear Science; Jun. 1998; pp. 1531-1536; vol. 45; No. 3.

* cited by examiner

| Percentage of optical activity time with pumping which creates recovery through annealing | Fiber B | Fiber C | Fiber A |
|---|---|---|---|
| 0.00% | 64.06% | 48.68% | 18.54% |
| 0.01% | 71.34% | 62.53% | 37.80% |
| 0.10% | 75.21% | 68.67% | 48.28% |
| 1.00% | 79.30% | 75.41% | 61.67% |
| 10.00% | 83.60% | 82.81% | 78.78% |
| 50.00% | 86.74% | 88.41% | 93.48% |
| 100.00% | 88.14% | 90.94% | 100.63% |

FIG. 4

OPTICAL TRANSMISSION

TECHNICAL FIELD

The present invention relates to transmission via optical fibers in satellites and spacecraft and other high radiation environments.

BACKGROUND

The Sun emits hazardous radiation in the form of SPEs (Solar Particle Events). These charged and highly energetic particles can interact with materials and cause: lattice deformation via ionization (both directly and indirectly); lattice deformation by direct collision; impurity creation in the lattice by neutron capture (neutrons produced in primary interactions); energy deposition which can lead to build up of charge, thus distorting the lattice. In addition to SPEs, there are also Galactic Cosmic Rays (GCR), energetic charged particles from Deep Space. These are less apparent because the solar activity deflects the GCR. Occasionally, the Sun emits a coronal mass ejection (CME) which is seen alongside a solar flare. CMEs release a much greater flux of SPEs and have been known to cause mission failure in satellites or spacecraft.

On Earth, the magnetosphere provides protection from the harmful radiation from the Sun and Deep Space by deflecting the majority of high energy particles. In addition, the atmosphere attenuates the energetic particles that do pass through the magnetosphere. However, when in orbit around the Earth, this protection is diminished due to lack of atmosphere and weakening of the magnetosphere with distance from the Earth's core. It is particularly harmful to have the satellites orbiting within the radii of the Van Allen belts due to their nature as regions of trapped electrons and protons within the inner magnetosphere, between 60 and 6000 miles altitude for the inner belt and between 8,400 to 36,000 miles for the outer belt. These radii vary with solar activity, so specific orbital tracks must be considered. Different elevation orbits have different associated dose rates, resulting in different total doses depending on the mission lifetime. A higher total dose is more harmful to both humans and equipment. It is also believed that a higher dose rate can have a more detrimental effect. In a geostationary orbit for 20 years, the expected total dose is 137 Gy from behind 10 mm thick aluminum shielding. In low earth orbit (LEO) the dose is less than half this value.

Both SPE and GCR lead to distortions in the lattice of a material and have specific effects on different types of materials. In optical materials, this can lead to defect creation via the previously mentioned processes in the fiber lattice structure. Not only is there creation of new defects, but intrinsic defects are also exacerbated. The radiation induced defects will absorb light, so that less light can propagate the fiber, resulting in so-called radiation induced attenuation (RIA). In order to keep the fiber as radiation tolerant as possible, it is therefore important to keep as perfect a lattice structure as possible.

It has previously been reported that a full recovery from radiation damage to optical fibers can be found from pumping at both 980 nm and 532 nm. It is, however, not ideal in space to have multiple pumps since this requires more mass, power and adds another layer of complexity in reliability testing.

It will be appreciated that the opportunities to repair or replace optical fibers located on satellites or spacecraft are very limited. Even if repair or replacement is possible, it is typically a very expensive process.

Furthermore, given the use typical applications of optical fibers within satellites and/or spacecraft, any damage thereto could have very serious implications. For example, the optical fibers may be utilized within a spacecraft's navigation system, and hence any damage thereto may cause the spacecraft to take an incorrect path.

It is therefore essential to ensure that optical fibers used on satellites and spacecraft are optimally resistant to damage, particularly radiation damage.

DEFINITIONS

As used herein, "optical" includes all forms of electromagnetic radiation, whether visible or invisible to the human eye.

As used herein, "extraterrestrial location" is any location outside of the Earth's atmosphere. Examples of extraterrestrial locations include a low earth orbit (LEO) such as that of the International Space Station (ISS), a medium earth orbit (MEO), a geostationary earth orbit (GEO) and a geostationary transfer orbit (GTO).

As used herein, "high radiation environment" is an environment in which the average radiation dose is greater than approximately $1 \times 10^{-5}$ Gy/h.

As used herein, an "active dopant" is a dopant which, when optically pumped, absorbs the pump photons and uses the absorbed energy to amplify the seed or signal transmitted by the optical fiber.

As used herein, a "passive dopant" is a dopant that, when pumped, does not substantially absorb the pump photons. A passive dopant may, however, modify the optical properties of the optical fiber through modifications of the structure thereof.

SUMMARY OF THE INVENTION

In accordance with the present invention, as seen from a first aspect, there is provided a spacecraft or satellite optical transmission apparatus comprising:
  an optical fiber comprising an active trivalent dopant and at least one passive trivalent dopant; and,
  at least one optical pump source operatively coupled to provide pump energy to the optical fiber.

It has been found by the applicant that an optical transmission system in accordance with the present invention demonstrates effective recovery from radiation induced attenuation (RIA). This is contrary to established thinking, which suggests that co-doping an active trivalent dopant with a passive trivalent dopant, particularly in high concentrations, produces an optical fiber with poor performance under radiation. Established thinking, in particular, suggests that co-doping an active trivalent dopant with aluminum produces an optical fiber that demonstrates greatly increased losses under high radiation conditions. It has been found by the applicant that optical pumping reverses this trend, which is believed to be due to the annealing of point defects associated with trivalent materials under such pumping.

The doping density of the one or more passive trivalent dopants may be varied according to the doping density of the active trivalent dopant. Preferably the ratio of doping densities of passive trivalent dopants to active trivalent dopants is between approximately 20 and approximately 180 to 1.

The active trivalent dopant and at least one passive trivalent dopant are preferably arranged in a trivalent matrix.

The optical fiber preferably comprises a single active trivalent dopant, but may comprise additional active trivalent dopants.

Preferably the active trivalent dopant is erbium. As will be appreciated by a person skilled in the art, erbium is a trivalent material, but its concentration is fixed by the amount of absorption that is required of the fiber. Erbium constitutes the active component of the fiber, which absorbs the pump photons and uses that energy to amplify a signal carried by the fiber. The erbium doping concentration is therefore varied according to the absorption required for the particular application.

Erbium may be provided at a doping density of between approximately 100 parts per million (ppm) and approximately 3000 ppm.

Preferably the one or more passive trivalent dopants are selected from the group consisting of: lanthanum; aluminum; and phosphorus.

As set out above co-doping with passive trivalent materials such as aluminium is thought to greatly increase radiation induced attenuation (RIA), which is undesirable. In the case without radiation induced attenuation though the addition of aluminium acts to acts to improve the spectral gain flatness and increase the overall usable spectral bandwidth of a fiber in a fiber amplifier. The addition of aluminium is also beneficial for the incorporation of a higher concentration of erbium and reduces unwanted erbium ion clustering which can improve the amplifier efficiency.

More preferably, the one or more passive trivalent dopants comprise aluminum and/or lanthanum.

The one or more passive trivalent dopants may comprise a member of the lanthanide series of chemical elements.

Preferably the one or more passive trivalent dopants comprise lanthanum, which is preferably provided at a dopant density between approximately 10,000 ppm and approximately 120,000 ppm. It has been found by the applicant that the presence of lanthanum in an optical fiber provides an improved recovery during anneal.

Alternatively or additionally, the one or more passive trivalent dopants may comprise trivalent aluminum, which may be provided at a doping density of between approximately 10,000 ppm and 60,000 ppm.

Alternatively or additionally, the one or more passive trivalent dopants may comprise phosphorus, which may be provided at a doping density of up to approximately 20,000 ppm.

The active trivalent dopants and the one or more passive trivalent dopants are preferably disposed within a core of the optical fiber.

The optical fiber, preferably the core thereof, may comprise silica, which preferably defines a base material.

The optical fiber, preferably the core thereof, may comprise germanium. Preferably the optical fiber, and more preferably the core thereof, comprises germanosilicate, which preferable defines a base material.

The core of the optical fiber preferably comprises a diameter of between approximately 2 μm and approximately 20 μm. More preferably, the core of the optical fiber comprises a diameter of between approximately 2 μm and approximately 7 μm.

The optical fiber preferably comprises a cladding layer that circumferentially surrounds the core. Preferably the cladding layer comprises a diameter of between approximately 60 μm and approximately 200 μm. More preferably, the cladding layer comprises a diameter of between approximately 120 μm and approximately 130 μm. Preferably of the optical fiber comprises an outer dual coating of acrylate.

The apparatus is preferably configured for optically pumping the optical fiber at a single wavelength only. In this regard, the apparatus comprises exactly one optical pump source configured for optically pumping at least a portion of the optical fiber.

It has been found by the applicant that an optical fiber comprising a passive trivalent dopant shows excellent recovery under optical annealing at a single pump wavelength. The present invention therefore obviates the requirement for multiple pumps and consequently permits reduction in the mass and complexity of the optical transmission apparatus. It will be appreciated that mass budgeting is vital to any space mission; an estimate from 2004 provided in "Spacecraft Systems Engineering" (Third Edition) gives a cost of $25,000 per kilogram of mass launched into space.

Preferably the optical pump source comprises a laser source.

The optical pump is preferably configured to provide pump energy having a wavelength of between approximately 800 nm and approximately 1100 nm. More preferably, the optical pump is configured to provide pump energy having a wavelength of between approximately 970 nm and approximately 990 nm. Whilst current space technology uses 1480 nm pumps, it has been found by the applicants that such pumps would not be particularly effective in annealing radiation induced damage.

Advantageously the pumping of the optical fiber at around 980 nm has been seen to reverse the trend of RIA in fibers containing trivalent materials such as aluminium or lanthanum. Also, it follows that the benefits of co-doping with these trivalent materials can now be achieved in high radiation environments. Therefore the fiber and apparatus described may provide superior gain flatness and maintain a wide spectral bandwidth in a high radiation environment for the lifetime of operation. This means that advantageously, the spectral performance of the fiber is maintained.

In a preferred embodiment, the optical transmission apparatus comprises an optical amplifier.

The optical amplifier may be included within a spacecraft or satellite data communications system, which may be arranged for internal or external communications.

In one embodiment, the optical transmission apparatus defines part of a fiber optic gyroscope, which may constitute part of a navigation system of the spacecraft or satellite. The optical transmission apparatus preferably defines an optical source of the fiber optic gyroscope. In use, a pulse of radiation from the optical source, is split by an optical splitter, the two pulses being injected into a closed loop or closed series of loops of optical fiber in different directions. If the fiber optic gyroscope is subjected to rotation in the plane of the loop or loops, the beam travelling against the rotation experiences a marginally shorter path delay than the other beam.

In accordance with the present invention, also as seen from a first aspect, there is provided a spacecraft or satellite comprising an optical transmission apparatus as hereinbefore described.

In accordance with the present invention, as seen from a second aspect, there is provided a method for transmitting electromagnetic radiation via an optical fiber in a high radiation environment, in which there is used:
 an optical fiber comprising an active trivalent dopant and at least one passive trivalent dopant; and,
 at least one optical pump source operatively coupled to provide pump energy to the optical fiber.

The high radiation environment may be an extraterrestrial environment, which includes but is not limited to a low earth orbit (LEO), medium earth orbit (MEO), geostationary earth orbit (GEO) or geostationary transfer orbit (GTO).

Alternatively or additionally, the high radiation environment may be within or proximal to a nuclear reactor facility.

Alternatively or additionally, the high radiation environment may be within or proximal to high energy physics (HEP) apparatus such as a particle collider.

Alternatively or additionally, the high radiation environment may be within radiation sensing apparatus.

Preferably the optical fiber comprises one or more of the above-mentioned features.

Preferably the optical pump source comprises one or more of the above-mentioned features.

Preferably the method comprises optically pumping the optical fiber with radiation from the optical pump source.

In accordance with the present invention, as seen from a third aspect, there is provided a radiation insensitive fiber laser cavity.

BRIEF DESCRIPTION OF THE DRAWINGS

An embodiment of the present invention will now be described by way of example only and with reference to the accompanying drawings, in which:

FIG. 4 is a table of results of the testing illustrated in FIG. 1; and

DETAILED DESCRIPTION

Figure 1:
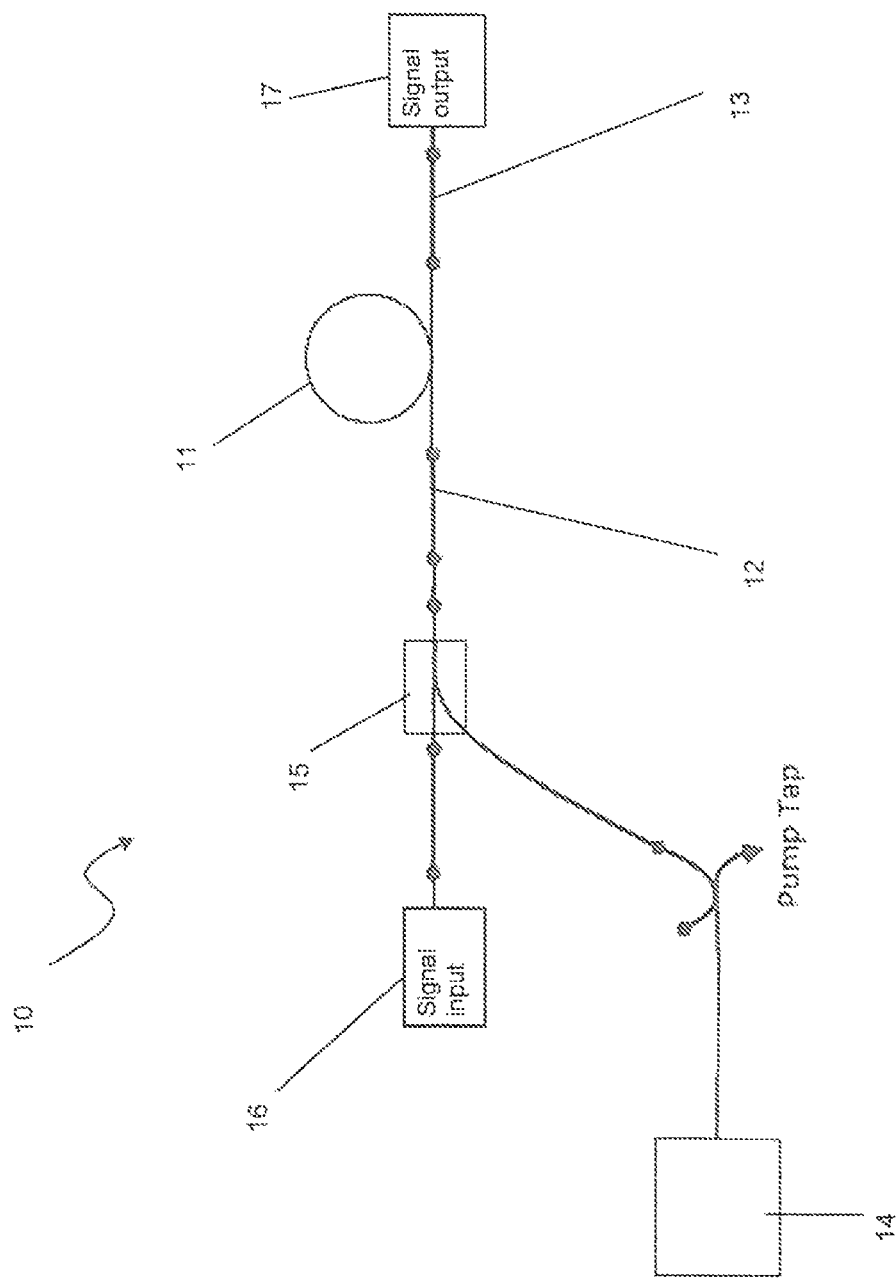
FIG. 1 is a schematic illustration of an optical transmission apparatus within a satellite or spacecraft in accordance with an embodiment of the present invention as seen from the first aspect.

Referring to FIG. 1 of the drawings, there is illustrated an optical transmission apparatus 10 of a satellite or spacecraft. In the illustrated embodiment, the optical transmission apparatus 10 is in the form of an erbium doped fiber amplifier (EDFA) within a satellite communications system.

The apparatus 10 comprises a first optical fiber 11 and second and third optical fibers 12, 13 at each longitudinal end of the first optical fiber 11. The first, second and third optical fibers 11, 12, 13 are optically coupled such that photons may travel in a first direction from the second fiber 12, through the first fiber 11 and subsequently through the third fiber.

The first fiber 11 comprises a central doped core between 3 and 20 μm in diameter, surrounded by 125 μm diameter cladding of pure silica. The fiber 11 may be further coated, for example in dual acrylate.

The core of the first optical fiber 11 is formed of germanosilicate doped with erbium, lanthanum and aluminum in the following doping densities (subject to +/−20%):
Erbium: 370 parts per million (ppm)
Lanthanum: between 10,000 and 20,000 ppm
Aluminum: between 35,000 and 60,000 ppm As will be appreciated by a person skilled in the art, erbium is an active trivalent dopant, whereas lanthanum and aluminum are passive trivalent dopants. The active trivalent dopant concentration, namely the erbium concentration, is fixed by the level of absorption required for the particular application but this is not the case for the passive trivalent dopants.

The second and third optical fibers 12, 13 are identical to one another, each comprising a central core and a surrounding cladding layer. The core of the second and third fibers 12, 13 is formed of germanosilicate; the cladding layer is formed of pure silica. The optical fibers 12, 13 may further comprise a coating, for example a dual; acrylate coating.

The apparatus 10 further comprises an optical pump source 14 in the form of a 980 nm laser source.

The fiber could be used as an ASE source, amending apparatus 10 by removing the signal input and pumping the fiber with no seed source.

A wavelength division multiplexing (WDM) coupler 15 is configured to couple a signal 16 to be amplified by the apparatus 10 with the output from the optical pump source 14. The WDM coupler 15 is located at a longitudinal end of the second optical fiber 12 distal to the first optical fiber 11.

In use, the doping in the first optical fiber 11 facilitates optical amplification: this is achieved by stimulated emission of photons from dopant ions in the core of fiber 11. In detail, the radiation from the laser source 14 excites the dopant ions into a higher energy level. Once in this higher energy level, the ions decay back to a lower energy level through stimulated emission of a photon at the signal wavelength, thereby amplifying the signal.

The first fiber 11 in the above-described embodiment will henceforth be referred to as fiber A.

In an alternative embodiment, the core of the first optical fiber 11 is formed of germanosilicate doped with erbium, lanthanum and aluminum the following doping densities (subject to +/−20%):
Erbium: 1200 ppm
Lanthanum: between 20,000 and 30,000 ppm
Aluminum: between 35,000 and 60,000 ppm In another alternative embodiment, the core of the first optical fiber 11 is formed of germanosilicate doped with erbium, lanthanum and aluminum in the following doping densities (subject to +/−20%):
Erbium: 1700 ppm
Lanthanum: between 80,000 and 120,000 ppm
Aluminum: between 35,000 and 60,000 ppm In another alternative embodiment, the core of the first optical fiber 11 is formed of germanosilicate doped with erbium and aluminum in the following doping densities (subject to +/−20%):
Erbium: 1100 ppm
Lanthanum: between 10,000 and 20,000 ppm
Aluminum: between 35,000 and 60,000 ppm In yet another alternative embodiment, the core of the first optical fiber 11 is formed of silica doped with erbium, aluminum and germanium in the following doping densities (subject to +/−20%):
Erbium: 2600 ppm
Lanthanum: between 10,000 and 20,000 ppm
Aluminum: between 35,000 and 60,000 ppm In certain embodiments, the core of the first optical fiber 11 may be doped with erbium and aluminum but not with lanthanum.

Figure 3:
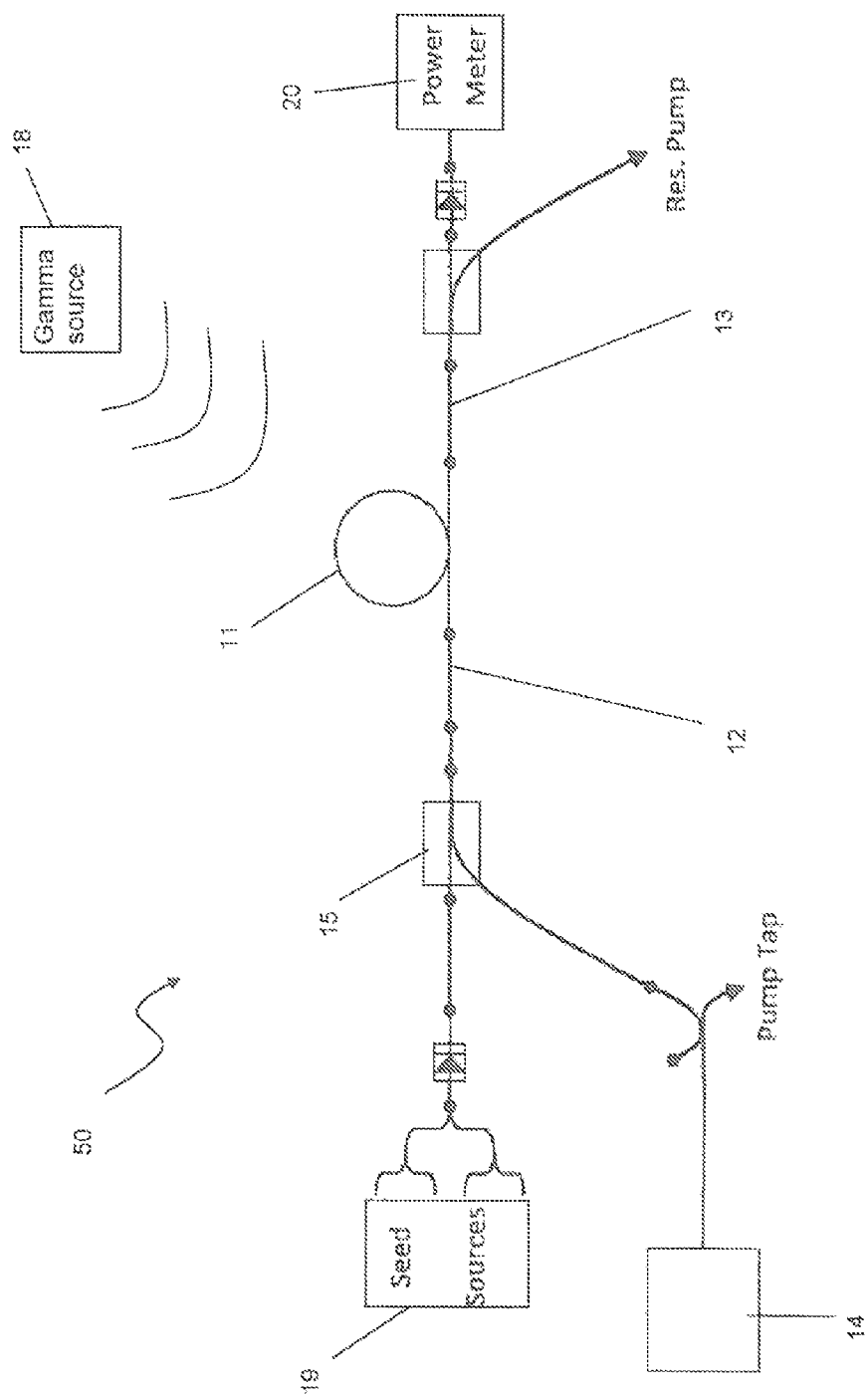
FIG. 3 is a schematic illustration of an apparatus used for testing the optical transmission apparatus illustrated in FIG. 1.

In one embodiment, herein fiber B, the core of the first optical fiber 11 is formed of silica doped with erbium and aluminum in the following doping densities (subject to +/−20%):
Erbium: 380 ppm
Aluminum: between 20,000 and 40,000 ppm In another alternative embodiment, herein fiber C, the core of the first optical fiber 11 is formed of germanosilicate doped with erbium and aluminum in the following doping densities (subject to +/−20%):
Erbium: 450 ppm
Aluminum: between 35,000 and 60,000 ppm FIG. 3 illustrates an apparatus 50 used by the applicant to test the effects of ionization on the first optical fiber 11 of the apparatus of FIG. 1. The various embodiments of this fiber 11 described above have each been tested by the applicant.

A gamma source 18 was used to simulate the effects of ionization, which are overwhelmingly responsible for radiation induced attenuation (RIA). The non-ionizing effects, such as lattice displacement, were not simulated but a consensus across the industry demonstrates that using a gamma radiation source to simulate the SEP flux is acceptable.

100 m lengths of fiber 11 was irradiated passively (without light or pump passing through) using a Co60 source for a period of four hours at a dose rate of 50 Gy/hr, confirmed by national standards. The total dose was therefore 200 Gy, which is equivalent to 146% the total radiation dose in a 20 year mission lifetime in geostationary earth orbit (GEO). The radiation level tolerance was ±10% and the temperature was maintained between 23 and 25° C. A 100 meter length of each fiber 11 was kept as a control.

The fiber attenuation, i.e. optical loss, was tested with a PK2500 system across the wavelengths of interest, before and after radiation. RIA was calculated by subtracting the unradiated attenuation values from the post radiated value at each wavelength. The fiber was left for a year to thermally anneal at room temperature; it is assumed that all appreciable thermal annealing would have occurred in this time period.

Photo annealing was subsequently performed using the optical pump 14 at 974 nm at 175 mW (measured at the amplifying fiber) with seeds 19 at 1536.61 nm, 1541.35 nm, 1550.92 nm and 1552.52 nm. The length of the fiber 11 used was varied as a function of the absorption per meter at 1531 nm so that the total absorption over the full length was constant at 80 dB for each sample tested. The fiber 11 was pumped continuously at 974 nm for several days and the output power was measured at regular intervals by a power meter 20.

As will be appreciated by a person skilled in the art, radiating the fiber 11 at a high dose rate for a short amount of time then following with annealing is not identical treatment to simultaneously irradiating the fiber and photo-annealing, as would occur under continuous use in Earth orbit or other space applications. Instead, giving the total dosage in a short amount of time and then annealing the fiber 11 simulates a worst case scenario, since all of the damage requires healing. Furthermore, research within the industry reveals that the same total dose provided as a higher dose rate produces more damage than a lower dose rate for a longer period.

The output power was extrapolated to 20 years using a power curve fit, in keeping with kinetic models of radiation damage such as those discussed by D. L. Griscom, M. E. Gingerich and E. J. Friebele in "Model for the dose, dose rate, and temperature dependence of radiation-induced loss in optical fibers" (IEEE TRANS. NUCL. SCI., VOL. 41, pp. 523-527, 1994) and G. M. Williams and E. J. Frieble in "Space radiation effects on erbium doped fiber devices: sources, amplifiers, and passive measurements" (IEEE Trans. Nucl. Sci., vol. 45, pp. 1531-1536, June 1998).

The percentage recovery was found by calculating the extrapolated final output as a percentage of the control fiber output. The results for fibers A, B and C may be seen in FIG. 4. It will be appreciated that fiber A cannot recover to above 100%; the figure of 100.63% is due to a small standard error within the experimental process.

Testing as described above has demonstrated that a satellite or spacecraft optical transmission apparatus in accordance with the present invention 10 shows excellent recovery from radiation damage and is likely to withstand a 20 year mission lifetime. It is believed by the applicants that the recovery mechanism is the annealing of point defects associated with trivalent materials under pumping of 980 nm.

Furthermore, it can be seen from the results of such tests that an optical fiber doped with lanthanum, such as fiber A, show rapid recovery despite suffering substantial initial radiation damage. Accordingly, such fibers are suitable for use in high radiation environments such as space over prolonged periods. In particular, such fibers are best suited to applications where the pump will be active for more than 20% of the mission lifetime. On the other hand, an optical fiber without lanthanum doping, such as fiber B, is more resistant to initial damage but demonstrates a slower rate of recovery. Accordingly, such fibers are optimal for use for less than 20% of a 20 year mission lifetime.

Figure 2:
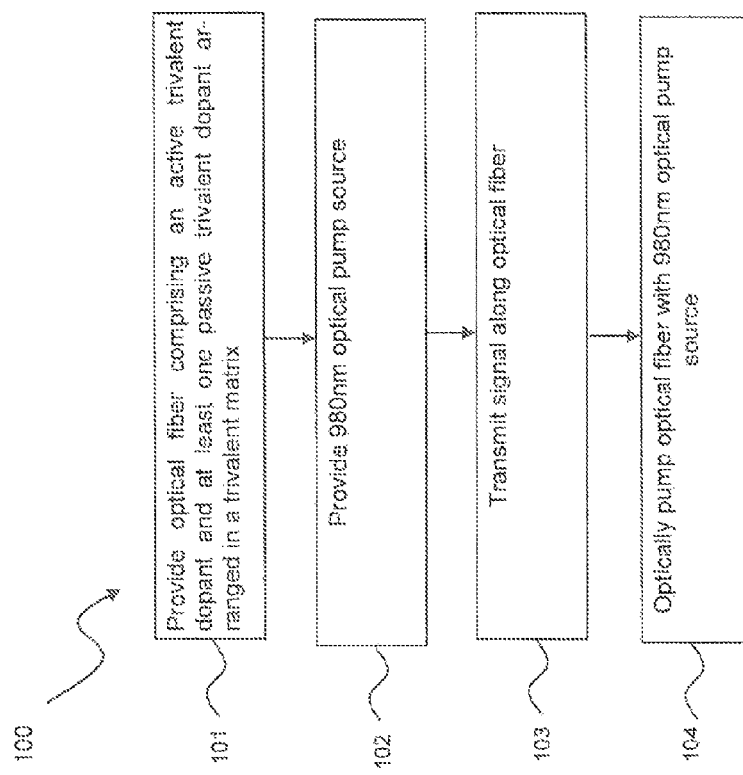
FIG. 2 is a flow diagram of a method for transmitting electromagnetic radiation via an optical fiber in a high radiation environment in accordance with an embodiment of the present invention as seen from the second aspect.

With reference to FIG. 2 of the drawings, there is illustrated a method 100 for transmitting electromagnetic radiation via an optical fiber in a high radiation environment in accordance with an embodiment of the present invention.

In the illustrated embodiment, the high radiation environment is an extraterrestrial environment such as a low Earth orbit (LEO). Alternatively, the high radiation environment may be within a nuclear reactor facility, for example.

The method comprises providing, to a high radiation environment, an optical fiber comprising an active trivalent dopant and at least one passive trivalent dopant at step 101. The optical fiber may be as hereinbefore described in relation to the apparatus illustrated in FIG. 1. For example, the core may be formed of silica doped with erbium, lanthanum, aluminum and trivalent germanium in the following doping densities:
Erbium: 370 parts per million (ppm)
Lanthanum: between 10,000 and 20,000 ppm
Aluminum: between 35,000 and 50,000 ppm
Germanium: 10,000 ppm Alternatively, the core may comprise doping as described in the alternative embodiments above.

At step 102, the method comprises providing, to a high radiation environment, an optical pump source configured to provide an output at approximately 980 nm, for example the optical pump source 14 illustrated in the assembly 10 of FIG. 1.

The method further comprises, at step 103, transmitting a signal along the optical fiber in a high radiation environment. The signal is amplified during its transmission. The signal may, for example, be a communications signal within an intra-satellite data transfer system.

The method further comprises pumping the optical fiber at a wavelength of approximately 980 nm at step 104, this step preferably being performed in the high radiation environment.

Figure 5:
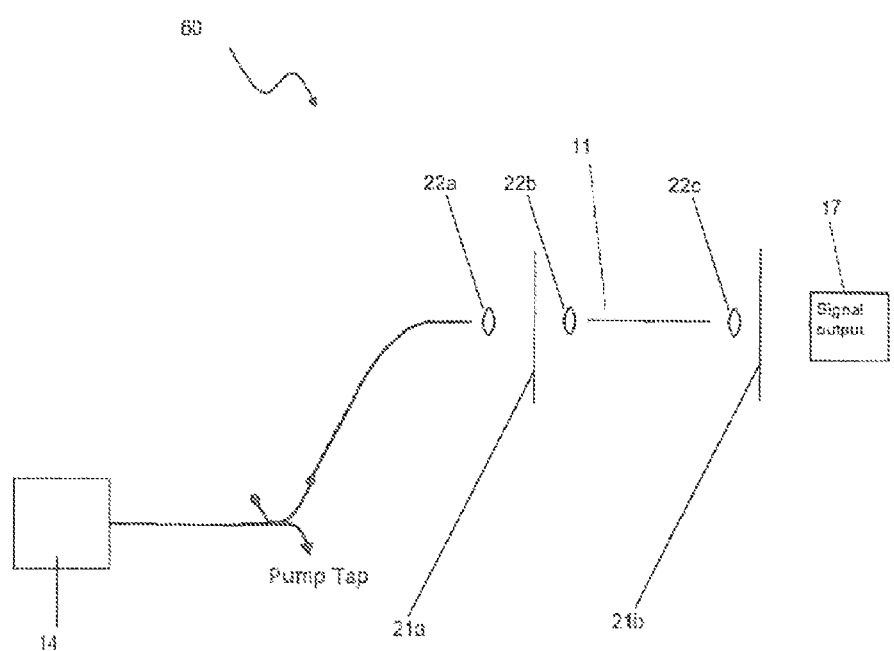
FIG. 5 is a schematic illustration of an optical transmission apparatus of FIG. 1, in accordance with an alternative embodiment of the present invention as seen from the first aspect.

The method may also comprise creating multiple passes though a fiber laser cavity. The apparatus 60 for use with this method is illustrated in FIG. 5. The cavity is defined between two reflective or partially reflective surfaces such as mirrors 21a, 21b. Alternatively, the reflective mechanism may be in the form of Bragg gratings.

A length of optical fiber 11 extends between the two mirrors 21a, 21b. The core of the optical fiber 11 comprises an active trivalent dopant such as erbium and passive trivalent dopants such as lanthanum and/or aluminum. The optical fiber 11 may be as hereinbefore described in relation to the apparatus illustrated in FIG. 1.

Second and third optical fibers 12, 13 in an embodiment are optically coupled to the first optical fiber 11 at respective longitudinal ends thereof. The second and third optical fibers 12, 13 may be as hereinbefore described in relation to the apparatus illustrated in FIG. 1. Alternatively, the second and third optical fibers 12, 13 may be identical to the first optical fiber 11 such that the apparatus 60 comprises only one optical fiber. The apparatus of FIG. 5 illustrates a free space set up and includes lenses 22a, 22b and 22c for focusing and collimating.

An optical pump source 14 is configured to pump the optical fiber 11 12, 13 at approximately 980 nm.

Various modifications may be made to the described embodiments of apparatus and method without departing from the scope of the present invention. For example other dopants such as thulium, ytterbium, holium and/or neodymium could be included in the fiber composition. The radiation may be from any source and may be delivered at a constant dose rate or pulsed. The pump wavelength may be varied in accordance with the rare earth dopant that is selected. All such variations and modifications are intended to be included within the scope of the appended claims. For example the optical transmission apparatus may be included within a steering or other control system for a spacecraft or satellite.

The invention claimed is:

1. An optical transmission apparatus, comprising:
   an optical fiber having a core including an active trivalent dopant and at least one passive trivalent dopant; and,
   at least one optical pump source operatively coupled to provide pump energy to the optical fiber at a frequency between 800 and 1,100 nm, the pump energy cooperative with the active and passive dopants to accelerate photo-annealing of radiation damage in the optical fiber.

2. The apparatus according to claim 1, wherein the active trivalent dopant is erbium.

3. The apparatus according to claim 2, wherein the doping density of erbium is between approximately 100 ppm and approximately 3000 ppm.

4. The apparatus according to claim 1, wherein the one or more passive trivalent dopants are selected from the group consisting of: lanthanum; aluminum; and phosphorus.

5. The apparatus according to claim 1, wherein the one or more passive trivalent dopants comprise lanthanum at a dopant density of up between approximately 10,000 and approximately 120,000 ppm.

6. The apparatus according to claim 1, wherein the one or more passive trivalent dopants comprise trivalent aluminum at a doping density of between approximately 10,000 ppm and 60,000 ppm.

7. The transmission apparatus according to claim 1, wherein the one or more passive trivalent dopants includes phosphorus at a doping density of up to approximately 20,000 ppm.

8. The apparatus according to claim 1, wherein the active trivalent dopant and at least one passive trivalent dopant form a trivalent matrix.

9. The apparatus according to claim 1, wherein the core of the optical fiber comprises silica or germanosilicate, which defines a base material of the core.

10. The apparatus according to claim 1, wherein the apparatus is configured for optically pumping the optical fiber at a single wavelength only.

11. The apparatus according to claim 1, wherein the optical pump is configured to provide pump energy having a wavelength of between approximately 800 nm and approximately 1100 nm.

12. The apparatus according to claim 1, wherein the optical pump is configured to provide pump energy having a wavelength of between approximately 970 nm and approximately 990 nm.

13. The apparatus according to claim 1, wherein the optical amplifier forms part of a spacecraft or satellite data communications system.

14. The apparatus according to claim 1, wherein the optical transmission apparatus includes at least one of an amplified spontaneous emission (ASE) source and an optical amplifier.

15. The apparatus according to claim 1, wherein the optical transmission apparatus comprises at least one of a fiber laser and a fiber optic gyroscope.

16. A spacecraft or satellite including an optical transmission apparatus according to claim 1.

17. A method for repairing an optical fiber damaged due to radiation in a high radiation environment, comprising:
   providing an optical fiber comprising an active trivalent dopant including erbium and at least one passive trivalent dopant; and,
   pumping energy at a frequency between 800 and 1,100 nm, using at least one optical pump source, into the optical fiber to cause photo-annealing of the radiation damage in cooperation with the active and passive trivalent dopants.

18. The method according to claim 17, wherein the high radiation environment is an extraterrestrial environment.

19. The method according to claim 17, wherein the high radiation environment is selected to be within or proximal to at least one of a nuclear reactor facility and a high energy physics (HEP) apparatus.

20. A method of maintaining an optical fiber in a high radiation environment, comprising:
   providing an optical fiber having a core including an active trivalent dopant including erbium and at least one passive trivalent dopant selected from aluminum and lanthanum; and,
   connecting an optical pump to the optical fiber to pump energy at a frequency between 800 and 1,100 nm to accelerate photo-annealing of radiation damage in the optical fiber in cooperation with the active trivalent dopant and the at least one passive trivalent dopant.

21. The method of claim 20, wherein the core includes silica and is doped with erbium at a doping density of between 100 and 3000 ppm, and with aluminum between 20,000 and 60,000 ppm.

22. The method of claim 21, wherein the core is further doped with lanthanum at a doping density of between 10,000 and 120,000 ppm.

23. The method of claim 21, wherein the core further includes germanium.

24. The method of claim 20, wherein the frequency is 980 nm.

* * * * *